United States Patent [19]

Smeds

[11] 4,368,377
[45] Jan. 11, 1983

[54] METHOD AND APPARATUS FOR ACHIEVING A DRAUGHT-FREE ENVIRONMENT

[76] Inventor: Stig-Eric Smeds, Aldersbo, S-730 73 Ransta, Sweden

[21] Appl. No.: 204,372
[22] PCT Filed: Jan. 30, 1980
[86] PCT No.: PCT/SE80/00026
 § 371 Date: Sep. 30, 1980
 § 102(e) Date: Sep. 30, 1980
[87] PCT Pub. No.: WO80/01605
 PCT Pub. Date: Aug. 7, 1980

[30] Foreign Application Priority Data

Jan. 30, 1979 [SE] Sweden ............................. 7900814

[51] Int. Cl.³ .................... F24D 13/02; H05B 1/02; A01K 1/02
[52] U.S. Cl. ............................ 219/345; 219/358; 219/354
[58] Field of Search ............... 219/358, 345, 341, 374, 219/354, 405, 411, 342; 119/30, 31, 33, 37

[56] References Cited

U.S. PATENT DOCUMENTS

| | | |
|---|---|---|
| 530,016 | 11/1894 | Cinnamon ........................ 219/347 |
| 2,493,589 | 1/1950 | Caskell . |
| 2,610,285 | 9/1952 | Rusnak .................... 219/45 |
| 2,700,095 | 1/1955 | Needham .................... 319/19 |
| 2,745,940 | 5/1956 | Stroh ........................ 219/358 |
| 2,912,559 | 11/1959 | Kirschke . |
| 3,193,663 | 7/1965 | Budzich et al. . |
| 3,654,430 | 4/1972 | Thayer . |

FOREIGN PATENT DOCUMENTS

| | | |
|---|---|---|
| 1284380 | 3/1961 | France . |
| 1391443 | 1/1965 | France . |
| 365861 | 7/1974 | Sweden . |
| 395215 | 4/1977 | Sweden . |
| 28132 | 9/1977 | Sweden . |
| 268944 | 4/1927 | United Kingdom . |
| 1020602 | 2/1966 | United Kingdom . |

*Primary Examiner*—Bernard Roskoski
*Attorney, Agent, or Firm*—Oblon, Fisher, Spivak, McClelland & Maier

[57] ABSTRACT

An apparatus for achieving a draught-free environment within a defined zone of a larger room a heating ceiling is used. The heating ceiling is in form of a frame (2) having exchangeable foil sheets (4) intended to reflect heat from heat dissipating bodies, if any, within the zone. The heating ceiling has a heat loop (6) to produce additional heat complementary to the heat reflected by the foil sheets from the bodies so that a constant temperature is kept within the air volume of the zone. For control of the additional heat there is a sensor arranged in a chimney-like opening (9). The sensor is connected to a control circuit (7). With the heating ceiling there is obtained a wall-less and thereby an accessible zone having a well defined environment and mainly a constant temperature. Examples of applications for the heating ceiling are rearing animals, treating burns, and other activities where maintenance of draught-free environment and of constant temperature is important.

7 Claims, 2 Drawing Figures

METHOD AND APPARATUS FOR ACHIEVING A DRAUGHT-FREE ENVIRONMENT

TECHNICAL FIELD

The present invention relates to an apparatus for achieving a draught-free environment within a defined zone of a larger room. To this end there is utilized a heating ceiling provided with a reflector and being suspended over said zone of the room. With the heating ceiling a controllable additional heat can be obtained.

BACKGROUND ART

Such heating ceilings are mostly known in connection with rearing small animals. In rearing e.g. pigs it is common to use additional heat over certain portions of the room areas where the animals are kept. This is desirable since a piglet a few weeks old gives off considerable amounts of heat and since the temperature in the shed is kept low in relation to the temperature of the piglet for reasons of heat economy and with regard to the well-being of the sow.

The additional heat has so far been obtained either from heat lamps or ceiling units with a heat producing surface. The known heat emitting devices are continuous heat generators being raisable and lowerable to control the mount of emitted energy per surface unit.

TECHNICAL PROBLEMS AND CONDITIONS

Troublesome problems occur with the known heat-emitting devices, which continuously give off a constant additional heat irrespective of whether the piglet is under the device or not. One such problem is the draught which occurs due to the local heating, since this heating varies greatly between the occasions when the piglet is under the device and when the place is empty. When the piglet is under the heat-emitting device, the temperature namely increases, since heat is supplied both from the piglet itself and from the heat-emitting device. When the piglet leaves its place under the device, the temperature drops quickly, since one heat source thus disappears. This temperature variation gives rise to cold draughts under the heat-emitting device where the piglet is to be.

Another disadvantage resulting from the large temperature increase mentioned above is that it becomes too hot for the piglet to be comfortable under the device for any length of time. The piglet therefore moves out into the remaining part of the shed which has low temperature, and remains there until it gets cold. Changes between the different temperature zones have a deleterious effect on the health of the piglet, as with the draught described above.

Apart from the fact that the known heat-emitting devices thus do not give the animals the comfort they are intended to give, the continuously supplied heat also means wasted energy.

Problems and conditions corresponding thereto are also actual at patient treatment, e.g. of heavier burns. Here a well defined environment is required for the patient who must not be exposed to draught and temperature variations. Normally this has been obtained by introducing the patient in a climatized room defined by a floor, a ceiling and walls as well. Then it is natural that extreme problems arise to keep the climate unchanged, e.g. when the patient is to be treated. Thus, temperature variations will be the result when nurses visit the room and this in a turn will result in draught and other disturbances in the climate suited for the patient. Corresponding problems are also to be found in some degree owing to unregular energy radiation from the patient's body.

DISCLOSURE OF THE INVENTION

One object of the present invention is therefore to achieve a local draught-free environment zone. Another object is to maintain the temperature of the air constant under the heat-emitting mechanism, irrespective of the heat radiation which can emanate from heat sources, if any, within the zone. A still further object of the invention is that the heat-emitting mechanism is mounted at a pre-determined, adjustable height while its heat dissipation is regulated in a simple and comfortable, but reliable way by an electronic control circuit. Furthermore, the environment zone ought to be free accessable without any restricting walls.

The stated objects are fulfilled by a heating ceiling being suspended above a defined zone of a larger room, the heating ceiling having a reflector which partly reflects additional heat emitted from a heat source arranged on its underside, and partly reflects heat radiated from a heat dissipating body, if any, within the defined zone. The prevailing temperature of the air under the heating ceiling being sensed by a sensor arranged in a preferably chimney-like opening in the heating ceiling for controlling a regulator to the energy supply of the heat source.

Accordingly, there is achieved a constant temperature under the heating ceiling, irrespective of the presence or absence of a heat producing body, and the temperature can be set at a value which gives a well defined environment within a zone of the larger room which zone is defined of the heating ceiling only. The unhealthy disturbances in the form of a draught and heavy temperature changes are thus dispensed with. Economically, the invention constitutes a good technical solution to the energy saving problem, since with the regulator and associated sensor it is possible to carefully anticipate every temperature variation and not supply more external energy than is required.

BRIEF DESCRIPTION OF THE DRAWINGS

A preferred embodiment of the heating ceiling in accordance with the invention will now be described in the following while referring to the accompanying drawings, where.

BEST MODE OF CARRYING OUT THE INVENTION

Figure 1:
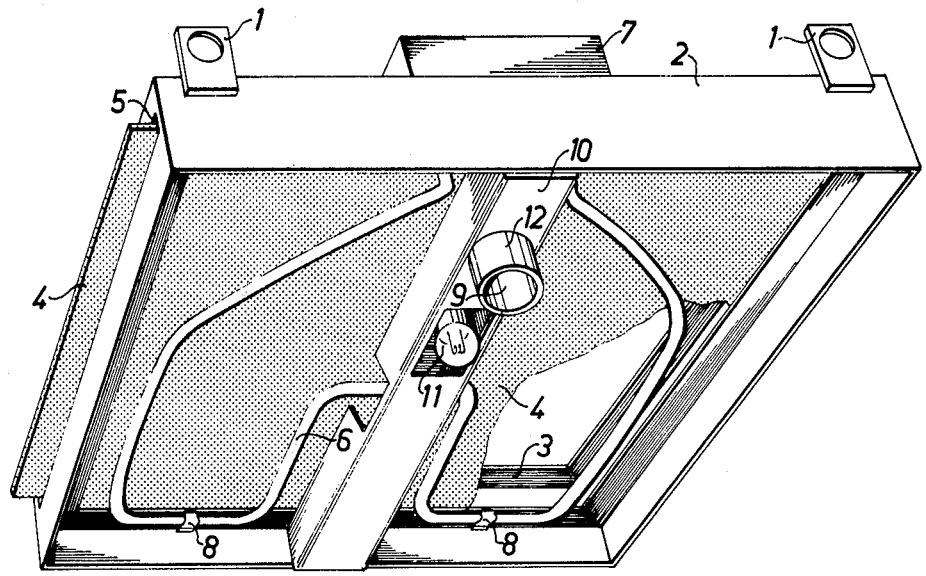
FIG. 1 is a perspective view of the heating ceiling.
Figure 2:
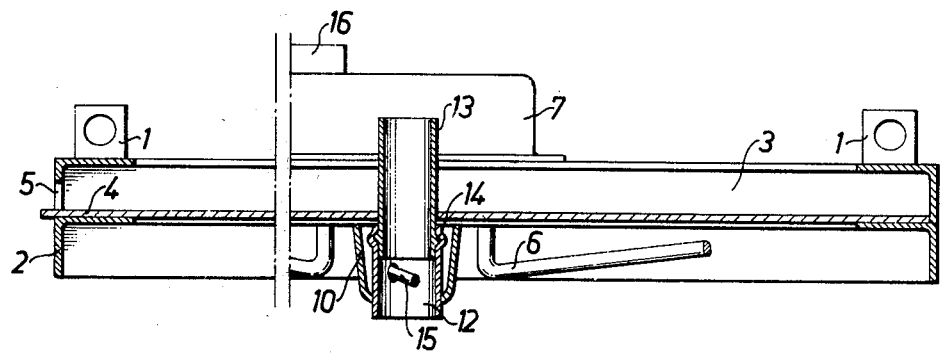
FIG. 2 is a sectional view through the heating ceiling.

A preferred embodiment of the heating ceiling in accordance with the invention includes, as will be seen from FIGS. 1 and 2, a frame means 2 provided with suspension eyes 1. This frame 2 can be made from aluminium sections and have a square, rectangular or other shape as required, each side having a slit 3 directed towards the centre of the frame. The side of the frame thus has an F-shaped cross section. The slit 3 is intended for receiving a bundle of foil sheets 4, which can be thrust into the slits 3 via an opening 5 in one of the sides of the frame 2. The foil sheets 4 have a reflecting surface and form a ceiling in the lamellar element, which includes the frame 2 and sheets 4. Under the bottommost sheet of foil, i.e. between the bottommost sheet 4 and the floor (not shown), when the heating ceiling is suspended in the eyes 1, there is arranged a heating element 6. The heating element 6 is formed as a loop starting from or connected to an electrical regulation circuit 5 arranged in a housing 7 on the upper side of the heating ceiling. The element 6 is disposed in juxtaposition to the foil sheet 4 without making contact with the latter and can be attached by clips 8 to one or some places along the inside of the frame 2 under the slit 3.

A chimney-like opening 9 is arranged centrally in the heating ceiling, the opening preferably including a pipe which will be described in more detail hereinafter. The opening 9 is made in a U-shaped cross member 10, going between two mutually opposing sides of the frame 2. The cross member 10 is attached under the slit 3 and also will constitute a support for a light source 11, if any.

The chimney-like opening 9 is shown in more detail in FIG. 2, where it will be seen that it includes a lower pipe or pipe cover 12 is directed towards the floor (not shown) and an upper pipe 13 passing up through the central portion of the heating ceiling, and intended for taking through a hole in the foil sheets 4 when these sheets are mounted in the slit 3. The pipe 13 is removable from the pipe cover 12, in which the pipe 13 can be locked by means of a snap fitting 14.

The lower pipe 12 is provided with a hole through which a sensor 15, associated with the electrical control circuit, thrusts into the "chimney". The purpose of this sensor 15 is to sense the temperature in the air rising up through the chimney 9.

The heating ceiling is suspended at a constant height. The control mechanism in the housing 7 is connected to a voltage supply and adjusted to the desired heat emission by means of a thumbwheel 16 which is connected to the electrical control circuit. The upper pipe 13 is removed from the heating ceiling and a bundle of foil sheets 4, lying loosely one on top of the other, are introduced into the slits 3 through the opening 5. The holes in the sheets 4 are brought into position above the upper end of the lower pipe 12, whereafter the upper pipe 13 can be inserted once again into the lower pipe 12 and locked there by the snap fitting 14. The position of the foil sheets 4 is thus fixed and the heating ceiling put in operation for giving a comfortable environment.

When the heating ceiling is used in connection with rearing animals it would be fitted with a light source 11 which by connecting the control mechanism to the voltage supply is illuminated. The light source 11 is preferably constitutes a 15 W filament lamp for providing guiding light. This is essential for causing the animals to seek out the prepared floor area. It has namely been established that piglets, for example, have a predilection for seeking out an illuminated place, and it has also been established that they unwillingly foul such a place.

The heating element 6 used is a black radiant heat loop with a delivered heating effect of between 100 and 150 W. The sensor 15 is activated by the temperature in the air flow through the chimney-like opening 9. If there are no heat dissipating body within the zone defined by the heating ceiling, the coil 6 is the sole heat source, but as soon as e.g. one or more piglets assume a place under the heating ceiling, there is the addition of radiated heat. A constant temperature in the air between the heating ceiling and floor is maintained by the sensor 15 and the associated control circuit, the loop 6 thus being supplied intermittently. By means of the reflecting surface of the foil sheet 4, not only the heat from the loop 6 but also the heat radiation from heat generating bodies, if any, under the heating ceiling is utilized. The heat radiation is thus effectively reflected from the reflecting surface and forms a fixed heat pocket over the area covered by the heating ceiling. The area of the chimney-like opening 9 is so small that the air stream departing therefrom is to small to cause a draught, but sufficiently large to allow a supply of fresh air from the rest of the shed to replace the departing air.

It has been found that the reflecting surface becomes dirty after some time in use, so that its reflective capacity becomes too small. The bottommost foil sheet 4 in the bundle of sheets can then be pulled out through the opening 5 (after the upper pipe 13 has been released from the lower pipe 12), so that a new reflection surface is obtained by having the next foil sheet uncovered. The pipe 13 is once again inserted in the lower pipe 12 after such foil change.

As will be seen from the above, there is a sensor 15 arranged inside the chimney-like opening 9. The sensor 15 is connected to the control circuit in the housing 7, the individual components of the circuit being such as are available on the open market. Desired heat emission can be adjusted and regulated by means of the control circuit in the housing 7 in response to the sensor 15.

In practical tests during normal operation in a large pig farm, the heating ceiling in accordance with the invention was suspended about 350 mm from the floor, and the control temperature in the chimney was set at 27° C. The piglets were attracted to the heat ceiling with the aid of the guide light. When the piglets were under the device, the greater portion of their heat dissipation was reflected back again. Very small additional heat was required for short periods of time to keep the set warmth. The least possible draught was obtained due to the additional heat being at a minimum and intermittent. The reflected heat consists of shortwave radiation which does not give rise to draughts. The additional heat amounted only to about 30% of what to be required by known heating ceilings. Thus this gives a considerable saving in energy. The radiated longwave heat from the pigs were thus utilized, this heat being converted to said shortwave radiation on reflection against the surface of the heat ceiling foil sheet 4, which was made from aluminium.

In the practical tests, it was found that the upper side of the foil sheet 4, i.e. the side facing away from the floor, was not notably warmed up. On the other hand, the heat radiation from the piglets, and the heat radiation from heating loop striking the downwardly-facing side of the foil sheet, were reflected, with an efficiency of over 95%, in the form of shortwave radiation. Furthermore, a 2°–3° C. difference between highest and lowest temperature under the heating ceiling was obtained with the heating ceiling in accordance with the invention. The temperature in the shed was then 18° C. and the set regulating temperature 27° C. The temperature at floor level within the heated zone was 25°–26° C. and the temperature of the piglets (their normal temperature) was 39° C. The temperature at floor level is in general at least 2°–3° C. higher than with known heating systems. Heat lost due to draughts was measured and found to correspond to a temperature loss of 0.3° C., which is considerably less than that achieved by previously known heating systems. As an example of the values for previously known systems, it can be mentioned that heat lamps give a temperature difference of about 30° C. between highest and lowest temperature within the heated zone and infraray heaters give about 18° C. difference.

The advantageous embodiment of the invention described above in conjunction with the drawings can be modified in different ways without departing from the inventive concept. For example, the heat coil can be formed in different ways. The foil sheet is suitably manufactured from aluminium and can take the form of a web running between two rollers where the consumed length of foil is coiled up on one roller at one side of the heat ceiling, at the same time as unused foil is unrolled from a roller on the opposite side of the heat ceiling. Other material with good reflection capacity can also be used. The pipes shown in the chimney-like opening can be modified in different ways to locate the position of the foil sheets. The upper side of the heating ceiling can be provided with an outer cover for protection against falling objects and dirt but also serving as protection against touch.

Even though the heating ceiling according to the invention being described above in connection with piglet rearing the invention may be used by some hospital treatment e.g. of babies and of burns. It is obvious that it can also be used in other fields of use where maintenance of draught-free environment and of constant temperature is important.

What is claimed as new and desired to be secured by Letters Patent of the United States is:

1. A heating ceiling having a substantially flat extension over a defined zone of a larger room for obtaining a draught-free environment defined to said zone and having a hole formed in the heating ceiling, said heating ceiling comprising:
    a frame-shaped element;
    a heat source mounted within and adjacent to said frame-shaped element and having energy supply means connected thereto;
    downwardly facing reflector means movably mounted within said frame-shaped element;
    a control circuit mounted on said frame-shaped element for controlling said energy supply means wherein said control circuit means further comprises a temperature sensor and wherein the reflector means further comprises a flat-shaped reflector means arranged to reflect radiated heat from one or more heat producing bodies to be positioned within said zone and also reflect supplementary additional heat from said heat source wherein said heat source is arranged in the immediate vicinity of a downward side of the reflector means;
    air passage means mounted in said heating ceiling for allowing air rising from the defined zone under the heating ceiling to pass therethrough wherein the air passage means further comprises a first pipe connected to said frame-shaped element, a second pipe connected to said first pipe and means for removably interconnecting said second pipe with said first pipe; and
    a temperature sensor mounted in said first pipe to sense the temperature of the air rising from the defined zone and passing through the air passage means.

2. A heating ceiling as claimed in claim 1, wherein said frame-like element has a slit formed therein and said reflector means further comprises a bottommost foil sheet of a bundle of foil sheets insertable in said slit in the frame-shaped element.

3. A heating ceiling as claimed in claim 1, further comprising a control housing wherein the control circuit is centrally arranged in said control housing at one side of the element, the heat source further comprises a loop shaped heat source connected to said control housing for extending under the reflector means and the air passage means comprises a chimney-like shaped air passage means centrally situated within the loop shaped heat source.

4. A heating ceiling as claimed in claim 2 wherein each of said foil sheets has a hole formed therein, the area and location of which corresponds to the area and location of the air passage means and wherein the pipe means extends immediately below the bottommost foil sheet in the bundle of sheets and extends through the bundle of sheets to open out in a free space above the heating ceiling.

5. A heating ceiling as claimed in claim 4 further comprising a cross member extending laterally across the frame-shaped element wherein the bundle of sheets rest against an upper side of said cross member and wherein the pipe means is connected to said cross member.

6. A heating ceiling as claimed in claim 1 wherein said frame-shaped element is substantially horizontally oriented.

7. A heating ceiling as claimed in claim 1 wherein said heat source is substantially horizontally oriented.

* * * * *